Patented Nov. 3, 1953

2,658,046

UNITED STATES PATENT OFFICE 2,658,046

SOFTENED COPOLYMER OF BUTADIENE AND STYRENE

Tracy M. Patrick, Jr., Dayton, Ohio, assignor to Monsanto Chemical Company, St. Louis, Mo., a corporation of Delaware No Drawing. Application May 4, 1951,
Serial No. 224,675

4 Claims. (Cl. 260—30.2)

This invention relates to a method of softening and tackifying rubber-like copolymers of butadiene-1,3 and styrene. More particularly it relates to softening these copolymers by incorporating therein certain catalytic softening agents and to the uncured copolymers containing the softeners. The rubber-like copolymer of butadiene and styrene is commonly known as GR-S. A modification prepared at a lower temperature than had become standard is known as cold rubber.

Softening natural rubber by catalytic chemical softeners is well known but the agents employed for this purpose are not generally suitable for softening butadiene-styrene copolymers. The softening and tackifying of these synthetic materials has been one of the most troublesome problems. Long periods of heating have been resorted to in order to provide a rubber which has sufficient plasticity and tack. The necessity for increasing the plasticity and tack arises for a number of reasons. The product must have sufficient plasticity to be processable. In operations where the stock is extruded rough uneven surfaces are obtained unless the composition is sufficiently plastic. Additionally, tackiness is necessary for the building of tires in order to secure adhesion between the plies. Finally, the compounding and milling of the copolymer is facilitated by decreasing its resistance to flow so that less time and power is consumed in the operation.

The addition to GR-S rubber of hydrazones has been proposed for several different purposes. Thus, the activity of these compounds is highly specific, some of them functioning as stiffening agents and others serving as catalytic aids in the heat softening process, the increased plasticity being manifest after storage usually at elevated temperatures in the presence of the softener. However, a class of hydrazones has now been discovered which exert a softening, plasticizing and tackifying effect immediately upon incorporation into the copolymer.

In accordance with the present invention it has been discovered that compounds possessing the structure $$\begin{array}{cc} R & H \\ T{-}C{=}N{-}N{-}A \end{array}$$

where T represents a thienyl group, R represents hydrogen or alkyl and A represents an aryl group, are valuable aids or catalysts for the softening of rubber-like butadiene-styrene copolymers. These compounds possess the attribute of softening immediately. Thus, when incorporated during the milling operation decreased resistance to flow is immediately noticeable. Examples of suitable thienyl groups represented by T include 5-halo-2-thienyl as for example 5-chloro-2-thienyl, 5-methyl-2-thienyl, 5-ethyl-2-thienyl, 5-propyl-2-thienyl, 5-butyl-2-thienyl and 2-thienyl. Examples of A are phenyl, mono-chlorphenyl, tolyl, bromphenyl, ethylphenyl and naphthyl. Examples of R comprise methyl, ethyl and propyl groups. The compounds in which R is hydrogen and particularly 2-thiophenealdehyde phenylhydrazone are preferred since they not only show strong initial softening but the softening is enhanced on continued heating or storage.

In general useful softening action is obtained by incorporating the hydrazones into the copolymer in amounts within the range of 0.5% to 10% on the copolymer. The addition of the usual compounding agents and curatives is contemplated and the softening persists in their presence. The addition of the softener can be made at any stage of the manufacture. For example addition may be made to the latex resulting from the emulsion copolymerization of butadiene and styrene or addition may be made to the coagulum before or after drying.

As an example of the use of the new softening agents to bring about an increased plasticity of rubber-like butadiene-styrene copolymers, a small amount was incorporated into standard GR-S. The GR-S was charged into a Banbury mixer and there was added thereto 0.5% on the copolymer of the softener. The batch was then sheeted out on a mill and the usual specimens prepared for plasticity readings. Plasticity readings were taken by means of a Mooney viscometer. In addition to these initial readings, further readings were taken after heating the samples for one hour in an oven at 125° C.

TABLE I

| Additive | Mooney plasticity readings | |
|---|---|---|
| | Initial | 1 hour at 125° C. |
| None | 36 | 34 |
| 2-thiophenealdehyde phenylhydrazone | 30 | 26 |
| 2-acetylthiophene phenylhydrazone | 31 | 27 |

As further exemplary of the invention various amounts of 2-thiophenealdehyde phenylhydrazone were incorporated into a typical cold rubber (X-478) and the plastic properties measured.

The copolymer was banded on a mill and the softener then added. After mixing the batch was cut off, sheeted and a portion placed in an oven at 85° C. for 18 hours. Another portion was placed in an oven at 163° C. for 10 minutes. The plasticity readings were then recorded on the initial samples and on the samples which had been heated by means of a Mooney viscometer according to A. S. T. M. specification D927-47T. Readings were also taken on a Williams parallel plate plastometer according to A. S. T. M. specification D926-47T. In addition to the softening exhibited by the initial readings, it will be noted that further softening took place on heating so that after 18 hours at 85° C. the samples were too soft and tacky to test.

TABLE II

| Amount of softener | Mooney | | | Williams | | |
|---|---|---|---|---|---|---|
| | Initial | 10 mins. at 163° C. | 18 hrs. at 85° C. | Initial | 10 mins. at 163° C. | 18 hrs. at 85° C. |
| None | 50 | 50 | 50 | 256 | 266 | 251 |
| 1.0 | 47 | 44 | (¹) | 195 | 203 | (¹) |
| 2.0 | 45 | 43 | (¹) | 180 | 153 | (¹) |
| 3.0 | 32 | 32 | (¹) | 147 | 133 | (¹) |

¹ Too soft to test.

The cured products from the softened copolymer exhibited normal physical properties. Vulcanizable stocks were prepared according to the following formula:

| | Parts by weight |
|---|---|
| Copolymer | 100.0 |
| Carbon black | 50.0 |
| Zinc oxide | 5.0 |
| Hydrocarbon softener | 8.0 |
| Sulfur | 2.0 |
| N-cyclohexyl-2-benzothiazole sulfanamide | 1.2 |

The compositions were cured in the usual manner by heating for 60 minutes in a press at 142° C. The stress strain data are as follows:

| Softener in copolymer | 0.0 | 1.0 | 2.0 | 3.0 |
|---|---|---|---|---|
| Modulus of elasticity at 300% elongation in lbs./in.² | 2,320 | 2,593 | 2,230 | 2,245 |
| Tensile at break in lbs./in.² | 3,473 | 3,226 | 2,850 | 3,255 |
| Ultimate elongation, percent | 420 | 380 | 380 | 460 |

As further exemplary of the invention 2.0% softener on the copolymer was incorporated into another cold rubber (X-432). The incorporation was carried out in a Banbury as described in the first example. After removal from the Banbury the batch was sheeted out on a mill and the usual specimens prepared for plasticity determination on both the Mooney plastometer and on the Firestone extrusion plastometer. Plasticity readings were taken on the initial samples and also on specimens which had been heated one hour at 125° C.

TABLE III

| Additive | Plasticity readings | | | |
|---|---|---|---|---|
| | Mooney | | Firestone | |
| | Initial | 1 hour at 125° C. | Initial | 1 hour at 125° C. |
| None | 47 | 47 | 22 | 27 |
| 2-thiophenealdehyde phenylhydrazone | 44 | 36 | 17 | 15 |
| 2-acetylthiophene phenylhydrazone | 43 | 40 | 17 | 22 |

In addition to the initial increase in plasticity it will be noted that heating the stocks containing 2-thiophenealdehyde phenylhydrazone resulted in considerable further improvement. Other compounds in which R in the above general formula is hydrogen function in similar manner as for example 5-chloro-2-thiophenealdehyde phenylhydrazone and 5-methyl-2-thiophenealdehyde phenylhydrazone.

The invention is not limited to the particular examples described above which are only illustrative thereof. This application is a continuation-in-part of my co-pending application Serial No. 174,783, filed July 19, 1950, now U. S. Patent 2,606,166.

What is claimed is:
1. An uncured rubber-like copolymer of butadiene and styrene which contains a compound of the structure

$$T-\overset{R}{\underset{}{C}}=N-\overset{H}{\underset{}{N}}-A$$

where T represents a thienyl group, A an aryl group and R is an alkyl group containing less than four carbon atoms.

2. An uncured rubber-like copolymer of butadiene and styrene which contains 2-acetylthiophene phenylhydrazone.

3. The method of decreasing the resistance to flow of an uncured rubber-like copolymer of butadiene and styrene which comprises incorporating therein a compound of the structure $$T-\overset{R}{\underset{}{C}}=N-\overset{H}{\underset{}{N}}-A$$

where T represents a thienyl group, A an aryl group and R is an alkyl group containing less than four carbon atoms, and masticating the copolymer until the resistance to flow is less than it would be in the absence of the said compound.

4. The method of decreasing the resistance to flow of an uncured rubber-like copolymer of butadiene and styrene which comprises incorporating therein 2-acetylthiophene phenylhydrazone and masticating the copolymer until the resistance to flow is less than it would be in the absence of said hydrazone.

TRACY M. PATRICK, JR.

References Cited in the file of this patent

UNITED STATES PATENTS

| Number | Name | Date |
|---|---|---|
| 2,280,484 | Gumlich | Apr. 21, 1942 |
| 2,494,593 | Sverdrup | Jan. 17, 1950 |
| 2,606,166 | Patrick | Aug. 5, 1952 |